United States Patent
Chen (10) Patent No.: US 6,744,538 B2
(45) Date of Patent: Jun. 1, 2004

(54) SCANNER OF VARIABLE SCANNING SPEEDS

(75) Inventor: Chih-Ming Chen, Taipei (TW)

(73) Assignee: Benq Corporation (TW)

( * ) Notice: Subject to any disclaimer, the term of this patent is extended or adjusted under 35 U.S.C. 154(b) by 614 days.

(21) Appl. No.: 09/725,811

(22) Filed: Nov. 30, 2000

(65) Prior Publication Data

US 2002/0030859 A1 Mar. 14, 2002

(30) Foreign Application Priority Data

Dec. 9, 1999 (TW) .................................... 88121542 A (51) Int. Cl.⁷ ................................................ H04N 1/04
(52) U.S. Cl. ...................... 358/474; 358/486; 358/412
(58) Field of Search .................. 358/474, 486, 358/412

(56) References Cited

U.S. PATENT DOCUMENTS 5,954,326 A * 9/1999 Gaarder et al. ............ 271/9.02

FOREIGN PATENT DOCUMENTS

CN 2213356 Y 11/1995

* cited by examiner

*Primary Examiner*—Edward Coles
*Assistant Examiner*—Heather D Gibbs
(74) *Attorney, Agent, or Firm*—Arent Fox (57) ABSTRACT

An optical scanner of variable scanning speeds is provided. The scanner includes a scanning module, a power transmission device, a gear module and a driving device. The scanning module is connected to the power transmission device. The gear module includes at least a first gear and a second gear, and the gear module switches between a first position and a second position. The driving device drives the gear module upward or downward. The driving device forces the scanning module and a scanned object to move relatively at a first speed through the first gear and the power transmission device when the gear module is at the first position, and the driving device forces the scanning module and the scanned object to move relatively at a second speed through the second gear and the power transmission device when the gear module is at the second position.

19 Claims, 6 Drawing Sheets

SCANNER OF VARIABLE SCANNING SPEEDS

FIELD OF THE INVENTION

The present invention relates to a scanner, and more particularly, to an optical scanner of variable scanning speeds.

BACKGROUND OF THE INVENTION

A scanner is a popular computer peripheral device. The scanner can transfer photographs, texts and pictures on a scanned object to image files. There are two different kinds of resolutions for a scanner: the horizontal resolution and the vertical resolution. The horizontal resolution, which is also called the optical resolution, represents the dot number being captured by a scanning module of the scanner on a scanned object per inch. The vertical resolution, which is also called the mechanical resolution, is determined by the relative movement speed between the scanning module and the scanned object. A conventional scanner uses a stepping motor to drive the scanning module to move relatively to the scanned object or to drive the scanned object to move relatively to the scanning module, so the vertical resolution is determined by the rotation speed of the stepping motor. As a result, the rotation speed of the stepping motor determines the vertical resolution. However, a large variation of the rotation speed may deteriorate the stability of the stepping motor and thus degrade the scanning quality. Therefore the rotation speed of the stepping motor can only be varied in a limited range and consequently the vertical resolution can only be varied within a limited range. A conventional flat bed optical scanner is taken as an example and described in the following.

Figure 1:
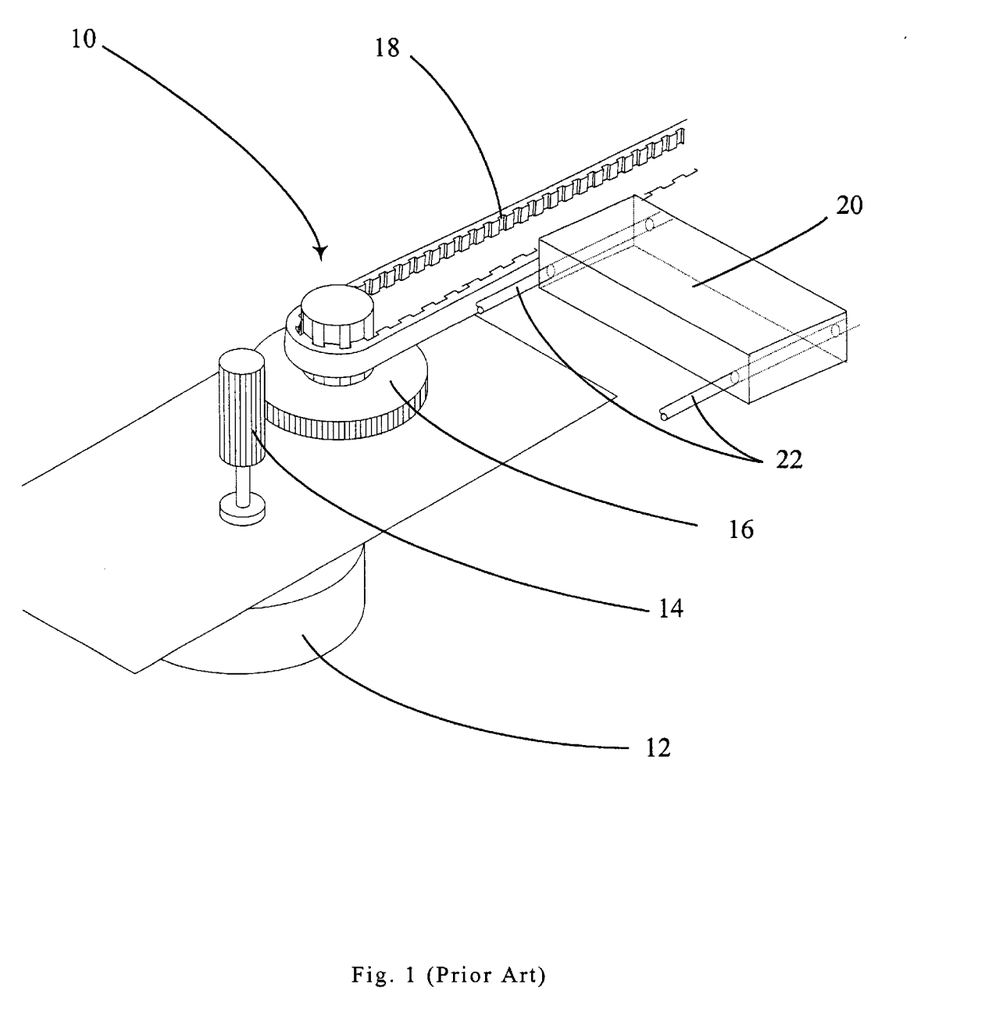
FIG. 1 is a schematic diagram of a conventional scanner.

Please refer to FIG. 1, which is a schematic diagram of a conventional flat bed scanner 10. The scanner 10 includes therein a stepping motor 12, an input gear 14, an output gear 16, a belt 18, a scanning module 20 and an axle 22. The scanning module 20 is connected and driven by the belt 18 to slide along the axle 22 during the scanning process. The flat bed scanner 10 uses the stepping motor 12 to drive the output gear 16 via the input gear 14. The belt 18 is driven by the output gear 16 and then forces the scanning module 20 to move relatively to the scanned object along the axle 22. To increase the vertical scanning resolution, the rotation speed of the stepping motor 12 is decreased to slow down the relative movement between the scanning module 20 and the scanned object. On the contrary, increasing the rotation speed of the stepping motor 12 will speed up the relative movement between the scanning module 20 and the scanned object, and thus decreases the vertical scanning resolution. Because a large variation of the rotation speed may deteriorate the stability of the stepping motor 12 and thus degrade the scanning quality, the rotation speed of the stepping motor 12 can only be changed in a limited range. Therefore, the vertical resolution of the conventional scanner 10 is limited within a small range.

SUMMARY OF THE INVENTION

Therefore, the present invention provides an optical scanner of variable scanning speeds. The scanner includes a scanning module, a power transmission device, a gear module and a driving device. The scanning module is connected to the power transmission device. The gear module includes at least a first gear and a second gear, and the gear module is capable of switching between a first position and a second position. The driving device drives the gear module. The driving device allows the scanning module and the scanned object to move relatively at a first speed through the first gear when the gear module switches to the first position. The driving device allows the scanning module and the scanned object to move relatively at a second speed by the second gear when the gear module switches to the second position.

DETAILED DESCRIPTION OF THE INVENTION

Figure 2:
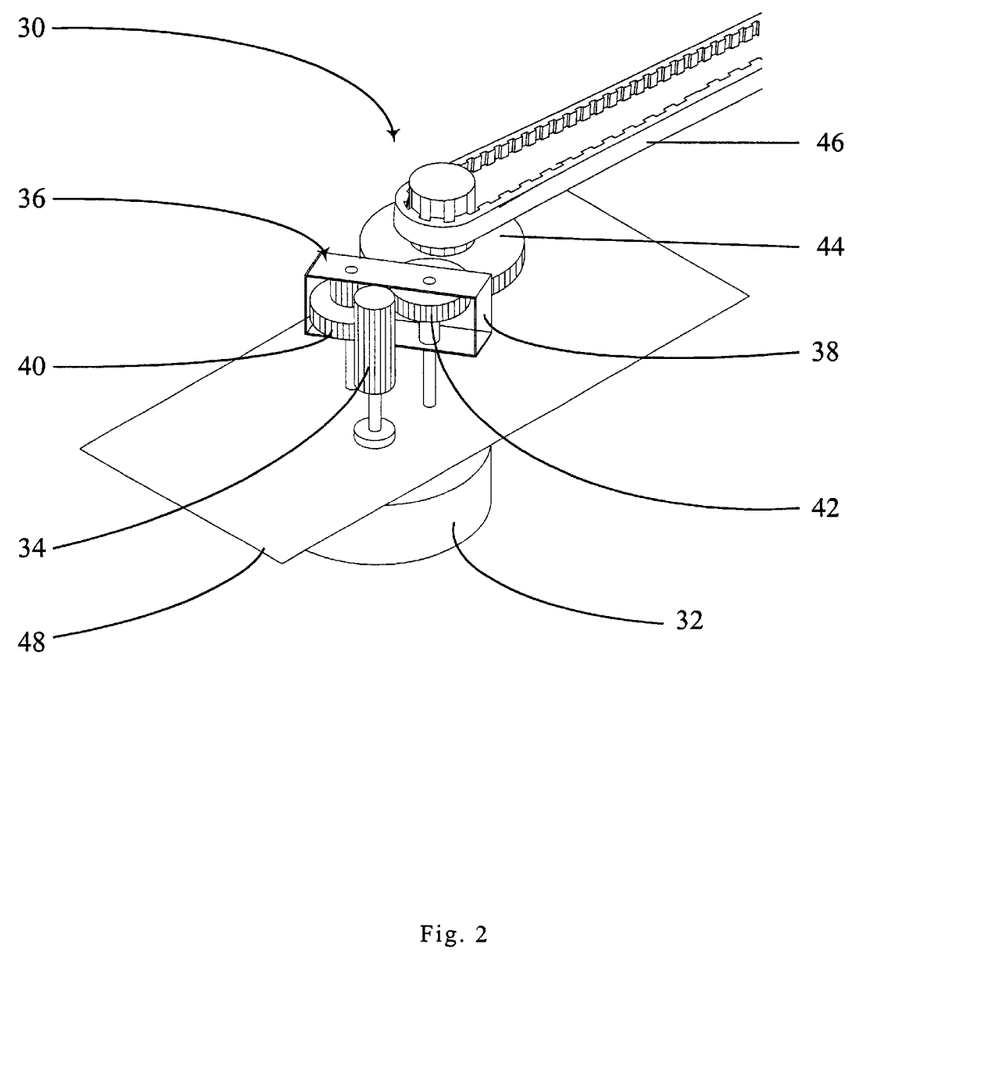
FIG. 2 is a schematic diagram of a scanner of variable scanning speeds according to the present invention.

Please refer to FIG. 2, which is a schematic diagram of a scanner 30 of variable scanning speeds according to the present invention. In addition to a scanning module (not shown), the scanner 30 includes a base 48, a stepping motor 32, a gear module 36 and a belt 46. The base 48 is used to support units such as the stepping motor 32, the gear module 36 and the belt 46. The stepping motor 32 provides power to drive the input gear 34 and thus drive the scanning module (not shown) to move relatively to the scanned object along an axle. The gear module 36 is supported by the base 48 and includes a gear driving case 38, a first gear 40, a second gear 42, an input gear 34 and an output gear 44. FIG. 2 shows a state in which the input gear 34 engages with both the first gear 40 and the second gear 42, and the output gear 44 engages with the first gear 40 to obtain power to drive the belt 46.

Figure 3:
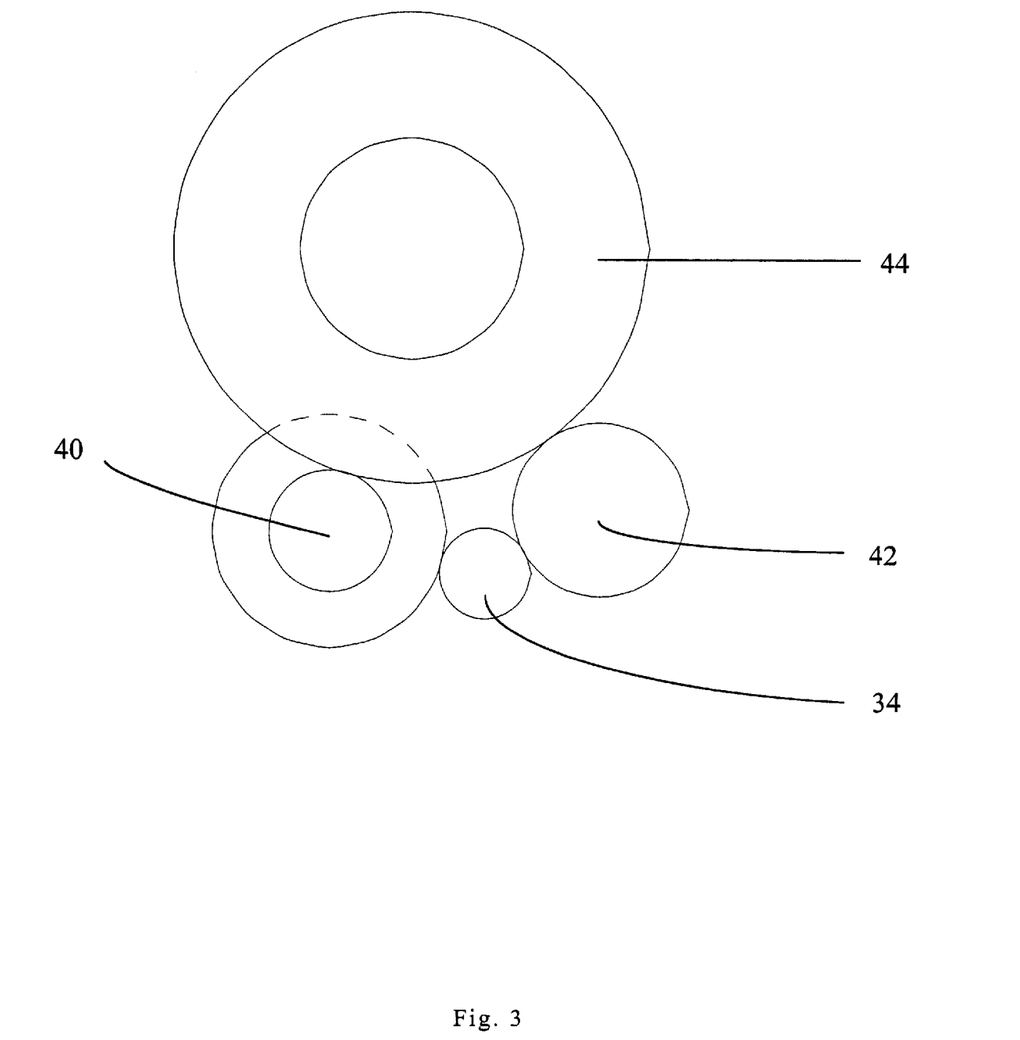
FIG. 3 is a top view of the gear module shown in FIG. 2.

Please refer to FIG. 3, which is a top view of the gear module 36 and depicts the relative positions between the input gear 34, the first gear 40, the second gear 42 and the output gear 44.

Figure 4:
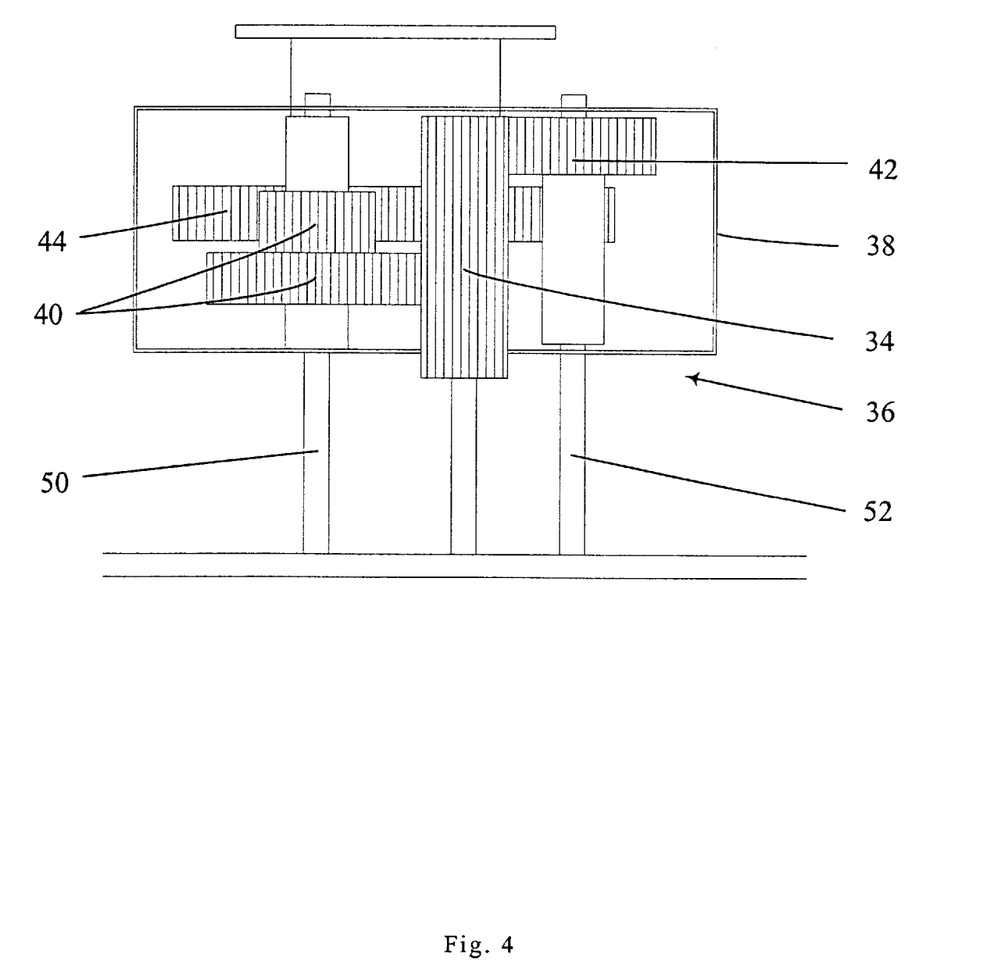
FIG. 4 is a front view of the gear driving case shown in FIG. 2 when the gear driving case is taking a first position.
Figure 6:
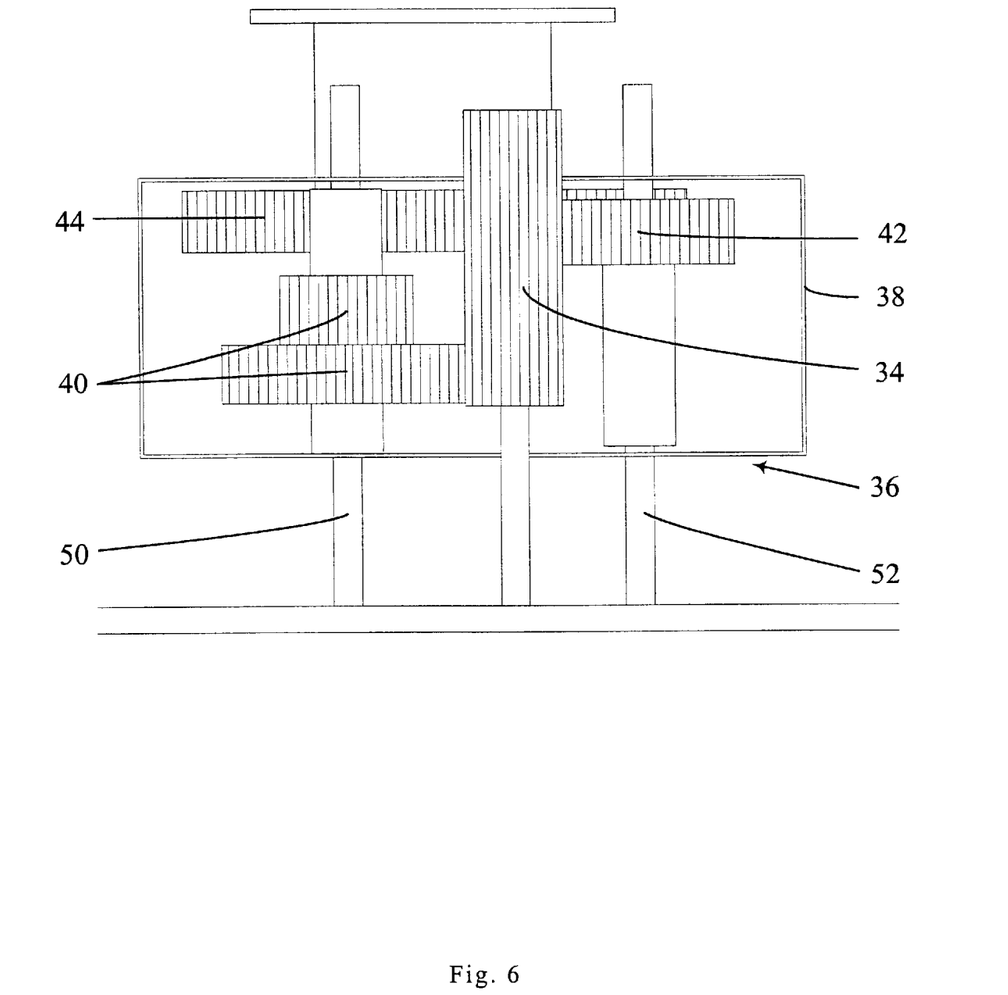
FIG. 6 is a front view of the gear driving case shown in FIG. 2 when the gear driving case is taking a second position.

Please refer to FIG. 4, in which the gear driving case 38 moves upwards to a first position. And FIG. 6 shows a state in which the gear driving case 38 moves downwards to a second position. The gear driving case 38 houses therein the first gear 40 and the second gear 42. As the gear driving case 38 moves upwards to a first position or moves downwards to a second position, the first gear 40 and the second gear 42 move upwards or downwards along a first axle 50 and a second axle 52 respectively. As the gear driving case 38 is at the first position, the first gear 40 engages with the output gear 44 and the second gear 42 does not engage with the output gear 44. The stepping motor 32, as a result, drives the scanning module (not shown) to move along an axle (not shown) at a first speed relatively to the scanned object via the input gear 34, the first gear 40, the output gear 44 and the belt 46.

Figure 5:
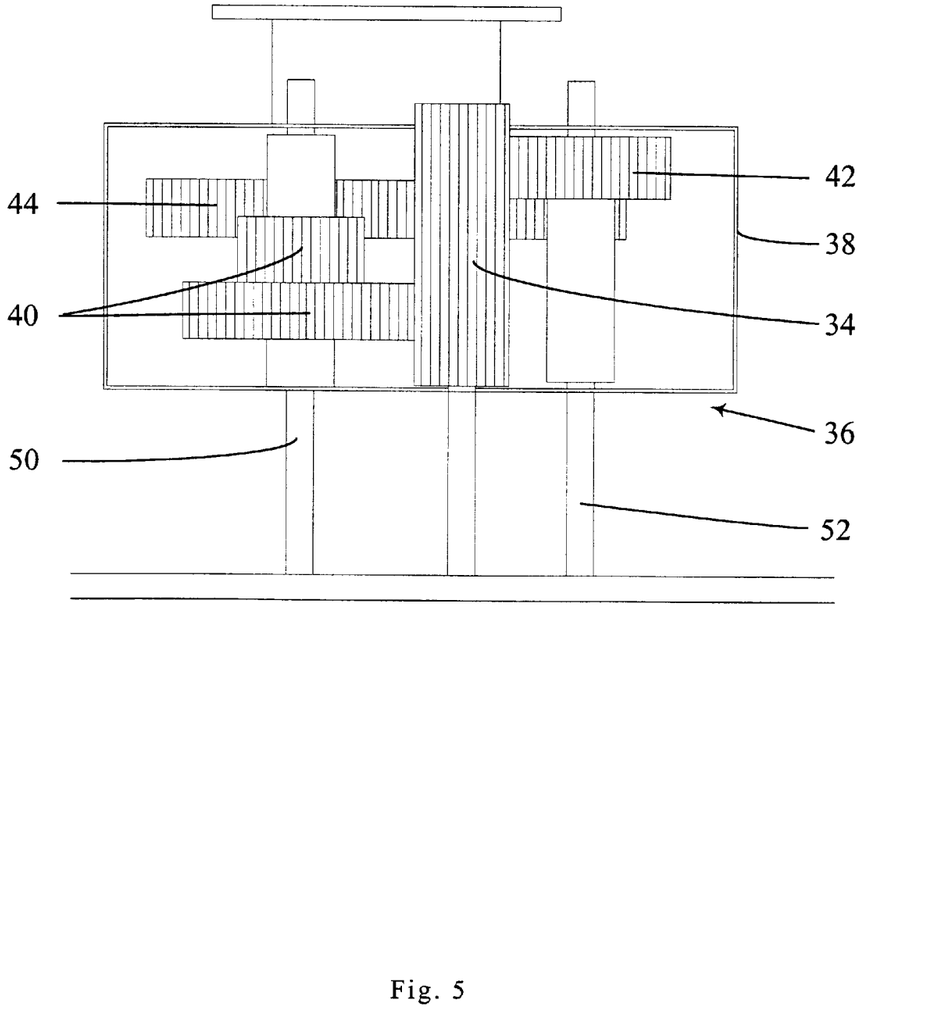
FIG. 5 is a front view of the gear driving case when it takes a position between the first and second positions.

Please refer to FIG. 5. FIG. 5 shows the gear driving case 38 moving between the first and second positions while neither position is reached yet. During the transition period when the gear driving case 38 switches from the first position to the second position but hasn't yet reached it, the output gear 44 engages with both the first gear 40 and the second gear 42 such that a smooth transition could be achieved and unnecessary bumps could be avoided. Similarly, a smooth transition is achieved when the gear driving case 38 switches from the second position to the first position, any unnecessary bumps could be avoided.

Please refer to FIG. 6, in which the second gear 42 engages with the output gear 44 and the first gear 40 does not. The stepping motor 32, as a result, drives the scanning module (not shown) to slide along the axle (not shown) at a second speed via the input gear 34, the second gear 42, the output gear 44 and the belt 46.

Comparing to the conventional optical scanner 10, the scanner 30 of the present invention uses a gear module 36 comprising a gear driving case 38, a first gear 40 and a second gear 42 to change the scanning speed of the scanning module and thus change the vertical resolution of the scanner. According the present invention, the scanning speed of the scanner does not have to be limited to a small range, the scanner can provide a wide variety of vertical resolutions. The scanner 30 of the present invention provides at least two vertical resolutions without changing the original rotation speed of the stepping motor 32. In another embodiment, the gear module 36 comprises three or more sets of gears to provide more vertical resolutions.

Although a flat bed scanner is taken as an example in the above embodiment, the present invention can also be applied to other kinds of image reading apparatus, such as a feed sheet scanner. The main difference between them may lie in that, in the flat bed scanner, the scanned object is stationary while the scanning module moves relatively to the scanned object. And in the feed sheet scanner, the scanning module is stationary while the scanned object moves relatively to the scanning module. These variations should also be included in the scope of the present invention.

Furthermore, the scanning module of the present invention can be a well-known charge coupled device (CCD) scanning module, a contact image sensor (CIS) scanning module or other scanning modules employing other image sensors.

The present invention may be in conjunction with the prior art using a stepping motor capable of changing its rotation speed. By doing so, more varieties of scanning speeds are possible and the scanner can provide various vertical resolutions in a wide range.

The above detailed description of the preferred embodiments is intended to describe features and spirits of the present invention. However, the disclosed preferred embodiments are not to limit the scope of the invention. On the contrary, the above description and various changes and equivalent arrangements are intended to be protected by the following claims. Therefore, the claims of the invention shall be interpreted in a broadest way on the basis of the above description and shall cover all possible equivalent changes and arrangements.

What is claimed is:

1. An image reading apparatus for reading an image of a scanned object, comprising:
    a scanning module;
    a first axle and a second axle;
    a gear module comprising a first gear and a second gear, the first gear being disposed on the first axle and the second gear being disposed on the second axle, the gear module sliding along the first axle and the second axle to selectively switch between a first position and a second position; and
    a driving device capable of selectively connecting to the first gear to make relative movement between the scanning module and the scanned object at a first speed when the gear module is located at the first position, or connecting to the second gear to make relative movement between the scanning module and the scanned object at a second speed when the gear module is located at the second position.

2. The image reading apparatus of claim 1, wherein the image reading apparatus further comprises a power transmission device connected to the scanning module to make the relative movement between the scanning module and the scanned object.

3. The image reading apparatus of claim 2, wherein the power transmission device includes an output gear and a belt, the output pear directly driving the power transmission device, and the first gear engages with the output gear when the gear module moves to the first position; the second pear engages with the output gear when the gear module moves to the second position, and always at least one of the first gear and the second gear engage with the output pear when the pear module is located between the first position and the second position.

4. The image reading apparatus of claim 1, further comprising a wherein the driving device is connected to the first gear when the gear module moves to the first position and the driving device is connected to the second gear when the gear module moves to the second position.

5. The image reading apparatus of claim 1, wherein the driving device comprises a stepping motor.

6. The image reading apparatus of claim 5, wherein the rotation speed of the stepping motor is variable.

7. The image reading apparatus of claim 1, wherein the scanning module is a CCD(charge coupled device) scanning module.

8. The image reading apparatus of claim 1, wherein the scanning module is a CIS(contact image sensor) scanning module.

9. An image reading apparatus for reading an image of a scanned object, comprising:
    a first axle and a second axle;
    a scanning module;
    a power transmission device, the scanning module being connected to the power transmission device;
    a gear module comprising a first gear and a second gear, the first gear being disposed on the first axle, and the second gear being disposed on the second axle, the gear module sliding alone the first axle and the second axle to switch between a first position and a second position, wherein the first gear couples to the power transmission device when the gear module switches to the first position, and the second gear couples to the power transmission device when the gear module switches to the second position, and the power transmission device couples to always at least one of the first gear and the second gear when the gear module switches between the first position and the second position; and
    a driving device connected to both the first gear and the second gear; wherein, when the gear module is at the first position, the driving device uses the first gear to force the scanning module and the scanned object to move relatively at a first speed; and when the gear module is at the second position, the driving device uses the second gear to force the scanning module and the scanned object to move relatively at a second speed.

10. The image reading apparatus of claim 9, wherein the gear module further comprises an input gear engaging with both the first gear and the second gear, the driving device directly drives the input gear.

11. The image reading apparatus of claim 10, wherein the gear module further comprises an output gear directly driving the power transmission device, the first gear engages with the output gear when the gear module moves to the first position; the second gear engages with the output gear when the gear module moves to the second position, and always at least one of the first gear and the second gear engage with the output gear when the gear module is located between the first position and the second position.

12. The image reading apparatus of claim 9, wherein the power transmission device is a belt.

13. The image reading apparatus of claim 9, wherein the gear module comprises a gear driving case accommodating the first gear and the second gear.

14. The image reading apparatus of claim 9, wherein the driving device is a stepping motor.

15. The image reading apparatus of claim 14, wherein the rotation speed of the stepping motor is variable.

16. The image reading apparatus of claim 9, wherein the scanning module is a CCD(charge coupled device) scanning module.

17. The image reading apparatus of claim 9, wherein the scanning module is a CIS(contact image sensor) scanning module.

18. A driving system capable of driving a scanning module to scan an original in a variable scanning speeds, the driving system comprising:

a base;

a first axle, and a second axle disposed on the base;

a gear module, said gear module comprising a first gear, and a second gear, the first gear disposed on the first axle, and the second gear disposed on the second axle, the gear module slidable between a first position and a second position; and an input gear rotated by an external motor, the input gear selectively engaging with one of the first gear and the second gear;

wherein when the gear module is disposed at the first position, the input gear engaging with the first gear, so the gear module forces the scanning module and the original to move relatively at a first speed by the first gear;

wherein when the gear module is disposed at the second position, the input gear engaging with the second gear, so the gear module forces the scanning module and the original to move relatively at a second speed by the second gear;

wherein when the gear module moves from the first position toward the second position, both the first gear slides along the first axle and the second gear slides along the second axle toward a first direction simultaneously; and wherein when the gear module moves from the second position toward the first position, both the first gear slides along the first axle and the second gear slides along the second axle toward a second direction simultaneously, the second direction is opposite to the first direction.

19. The driving system of claim 18, wherein when the gear module moves from the first position toward the second position, always at least one of the first gear and the second gear engages with the input gear.

* * * * *

UNITED STATES PATENT AND TRADEMARK OFFICE
CERTIFICATE OF CORRECTION

PATENT NO. : 6,744,538 B2
DATED : June 1, 2004
INVENTOR(S) : Chen

It is certified that error appears in the above-identified patent and that said Letters Patent is hereby corrected as shown below:

<u>Title page,</u>
Item [73], Assignee, should read:
-- Benq Corporation, Taoyuan, Taiwan --.

Signed and Sealed this

Twentieth Day of July, 2004

JON W. DUDAS
*Acting Director of the United States Patent and Trademark Office*